United States Patent [19]
Lattner et al.

[11] Patent Number: 5,832,953
[45] Date of Patent: Nov. 10, 1998

[54] OVERFILL SHUT-OFF SYSTEM FOR LIQUID STORAGE TANKS

[76] Inventors: Michael D. Lattner, 740 English La.; Daniel T. McDonell, 285 Bryant St., both of Dubuque, Iowa 52003

[21] Appl. No.: 607,265

[22] Filed: Feb. 20, 1996

[51] Int. Cl.[6] ............... F16K 31/22; F16K 31/24; F16K 31/34; F16K 43/00
[52] U.S. Cl. ............... 137/315; 137/413; 137/415; 137/426; 137/433; 137/447; 141/198
[58] Field of Search ................ 73/322, 322.5; 116/228; 137/413, 414, 415, 423, 426, 430, 432, 433, 444, 446, 447, 448, 558, 315; 141/59, 198; 251/44, 43

[56] References Cited

U.S. PATENT DOCUMENTS

| | | | |
|---|---|---|---|
| 1,852,118 | 4/1932 | Kahn | 73/322.5 |
| 2,562,604 | 7/1951 | Couchey | 116/228 |
| 2,616,450 | 11/1952 | Legge et al. | 137/413 |
| 2,731,030 | 1/1956 | Phillips et al. | 137/413 |
| 2,842,157 | 7/1958 | Mosher | 137/413 |
| 2,851,055 | 9/1958 | Mosher | 137/413 |
| 3,177,889 | 4/1965 | Hardison | 137/413 |
| 3,603,342 | 9/1971 | Bottoms | 137/414 |
| 3,618,629 | 11/1971 | Heyer et al. | 137/413 |
| 3,782,400 | 1/1974 | Hardison et al. | 137/413 |
| 3,929,155 | 12/1975 | Garretson | 137/430 |
| 4,305,422 | 12/1981 | Bannink | 137/430 |
| 4,444,230 | 4/1984 | Van Mullen | 137/430 |
| 4,671,317 | 6/1987 | MacKay | 137/411 |
| 4,741,358 | 5/1988 | Cho | 137/447 |
| 4,836,239 | 6/1989 | Kinkead | 137/413 |
| 5,007,450 | 4/1991 | Babb et al. | 137/447 |
| 5,033,519 | 7/1991 | Puffer et al. | 141/198 |
| 5,036,823 | 8/1991 | MacKinnon | 123/520 |
| 5,082,556 | 1/1992 | Reese | 210/90 |
| 5,095,937 | 3/1992 | LeBlanc et al. | 137/423 |
| 5,280,803 | 1/1994 | Swift et al. | 137/414 |
| 5,282,496 | 2/1994 | Kerger | 137/446 |
| 5,427,137 | 6/1995 | Bowen | 137/447 |
| 5,460,197 | 10/1995 | Kerger et al. | 137/413 |
| 5,464,037 | 11/1995 | Younes | 137/410 |
| 5,472,012 | 12/1995 | Wood et al. | 137/430 |
| 5,487,404 | 1/1996 | Kerger | 137/413 |

FOREIGN PATENT DOCUMENTS

| | | | |
|---|---|---|---|
| 2341807 | 9/1977 | France | 137/413 |
| 605477 | 6/1960 | Italy | 137/446 |

OTHER PUBLICATIONS

"OPW 61fStop AST Overfill Prevention Valve", published by OPW Fueling Components, Cincinnati, Ohio, Aug. 1994.

*Primary Examiner*—George L. Walton
*Attorney, Agent, or Firm*—Woodcock Washburn Kurtz Mackiewicz & Norris LLP

[57] ABSTRACT

An improved overfill shut-off system for a liquid storage tank includes a passage having an inlet end and an outlet end, a valve seat in the passage, a plunger that is movable within the passage for the purpose of engaging the valve seat to impede flow of liquid in the passage, and a guide member for guiding movement of the plunger. The plunger and the guide member are sealed with respect to each other and together define a control space. A first port is defined in the plunger for communicating the control space with an upstream end of the passage, and a second port is defined in the guide member for communicating the control space with a downstream end of the passage. A valve is provided for selectively impeding fluid flow through the second port in response to the level of a float member within the storage tank. When liquid level in the storage tank reaches a predetermined maximum, liquid flowing through the passage will be permitted through the first port, but not through the second port. This creates a hydraulic effect that will expand the control space and extend the plunger to engage the valve seat, thereby preventing overfill of the storage tank.

3 Claims, 4 Drawing Sheets

OVERFILL SHUT-OFF SYSTEM FOR LIQUID STORAGE TANKS

BACKGROUND OF THE INVENTION

1. Field of the Invention

This invention relates generally to the field of fluid handling and control, and more specifically to systems for controlling the level of liquid in a storage tank. The invention is especially well adapted for use with gasoline storage tanks of different sizes and capacities.

2. Description of the Prior Art

Liquid storage tanks, such as the aboveground and belowground tanks that are used to store substances such as gasoline and aviation fuel, are in wide use in the United States and throughout the world.

Typically, such a storage tank will be filled from a tank truck by means of a large diameter hose that is coupled to the upper end of a fill pipe during the filling operation. Because of the relatively large capacity of the storage tanks-from hundreds of gallons in the case of aboveground tanks to several thousand gallons for belowground tanks, a relatively high flow rate during the filling operation is desirable. At these high flow rates, it is quite common that the tank is overfilled and, upon uncoupling of the tank truck hose from the fill pipe, fuel within the hose spills into the manhole, or in the case of an aboveground tank, possibly on to the outside of the tank or ground. Several gallons of fuel may be involved in such a spillage.

In the case of aboveground tanks, environmental transfer of heat to the storage tank can also expand the volume of fuel within the tank, meaning that an overfilled tank might leak fuel through the expansion vents and into the environment. Obviously, avoiding such a scenario is a desirable goal.

Monitoring of the fuel level within an underground tank during the filling operation presents a problem in that the sole access to the interior of the tank is via the fill pipe. In aboveground tanks, access is similarly limited. Various sensing devices which will give a continuous reading of the fuel level within the tank during the filling operation have been proposed, however, typically these devices merely give a gauge reading to the fuel delivery man, who may not be paying close enough attention. Electronic monitoring is possible, but is subject to failure in the event of a power outage.

Various float actuated control arrangements have been proposed in which a valve in the fill pipe inlet is shifted to a closed position by a float within the tank when the level of fuel within the tank elevates the float to a position at which the float causes the valve to close. Unfortunately, the floats in such systems are usually offset from the fill pipe inlet, making it difficult to install and remove the systems.

A second problem is the water hammer effect that tends to be produced in systems where a valve is suddenly closed to prevent fluid flow through the fill passage. A third problem presented by such float controlled valves is the fact that upon closure of the valve, the flow passage above the closed valve is filled with fuel which will spill when the tank truck hose is uncoupled from the fill pipe.

Another problem that in general has slowed implementation and development of previously known overfill prevention systems is the general complexity, reliability and expense that has come to be associated with the systems.

It is clear that a need exists in this area of technology for an improved overfill prevention device for a storage tank that is easily insertable and mountable within the storage tank, that is not plagued by the water hammer effect, that permits incoming fuel to drain from the fuel pipe after shut-off, and that is relatively simple, reliable and inexpensive.

SUMMARY OF THE INVENTION

Accordingly, objects of this invention are to provide an improved overfill prevention device for a storage tank that is easily insertable and mountable within the storage tank, that is not plagued by the water hammer effect, that permits incoming fuel to drain from the fuel pipe after shut-off, and that is relatively simple, reliable and inexpensive.

In order to achieve the above and other objects of the invention, an overfill shut-off system for a liquid storage tank, includes, according to a first aspect of the invention, passage defining structure for guiding liquid into a storage tank, the passage defining structure defining a passage having an inlet end and an outlet end; a valve seat that is connected to the passage defining structure; plunger structure, movably positioned within the passage, for engaging the valve seat to impede flow of liquid in the passage; guide structure, positioned within the passage, for guiding movement of the plunger structure, the plunger structure being sealed with respect to the guide structure and together with the guide structure defining a control space; a first port defined in the plunger structure for communicating the control space with an upstream end of the passage; a second port defined in the guide structure for communicating the control space with a downstream end of the passage; valve structure for selectively impeding fluid flow through the second port; and level responsive structure for closing the valve structure when liquid level in a liquid storage tank reaches a predetermined maximum, whereby liquid flowing through the passage will be permitted through the first port, but not through the second port, creating a hydraulic effect that will expand the control space and extend the plunger to engage the valve seat, thereby preventing overfill of the storage tank.

According to a second aspect of the invention, an improved liquid storage tank system that is constructed so as to be difficult to overfill includes a storage tank having a fill opening defined therein; and an overfill shut-off system, positioned in the fill opening, that includes passage defining structure for guiding liquid through the fill opening into the storage tank, the passage defining structure defining a passage having an inlet end and an outlet end; a valve seat that is connected to the passage defining structure; plunger structure, movably positioned within the passage, for engaging the valve seat to impede flow of liquid in the passage; guide structure, positioned within the passage, for guiding movement of the plunger structure, the plunger structure being sealed with respect to the guide structure and together with the guide structure defining a control space; a first port defined in the plunger structure for communicating the control space with an upstream end of the passage; a second port defined in the guide structure for communicating the control space with a downstream end of the passage; valve structure for selectively impeding fluid flow through the second port; and level responsive structure for closing the valve structure when liquid level in the storage tank reaches a predetermined maximum, whereby liquid flowing through the passage will be permitted through the first port, but not through the second port, creating a hydraulic effect that will expand the control space and extend the plunger to engage the valve seat, thereby preventing overfill of the storage tank.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
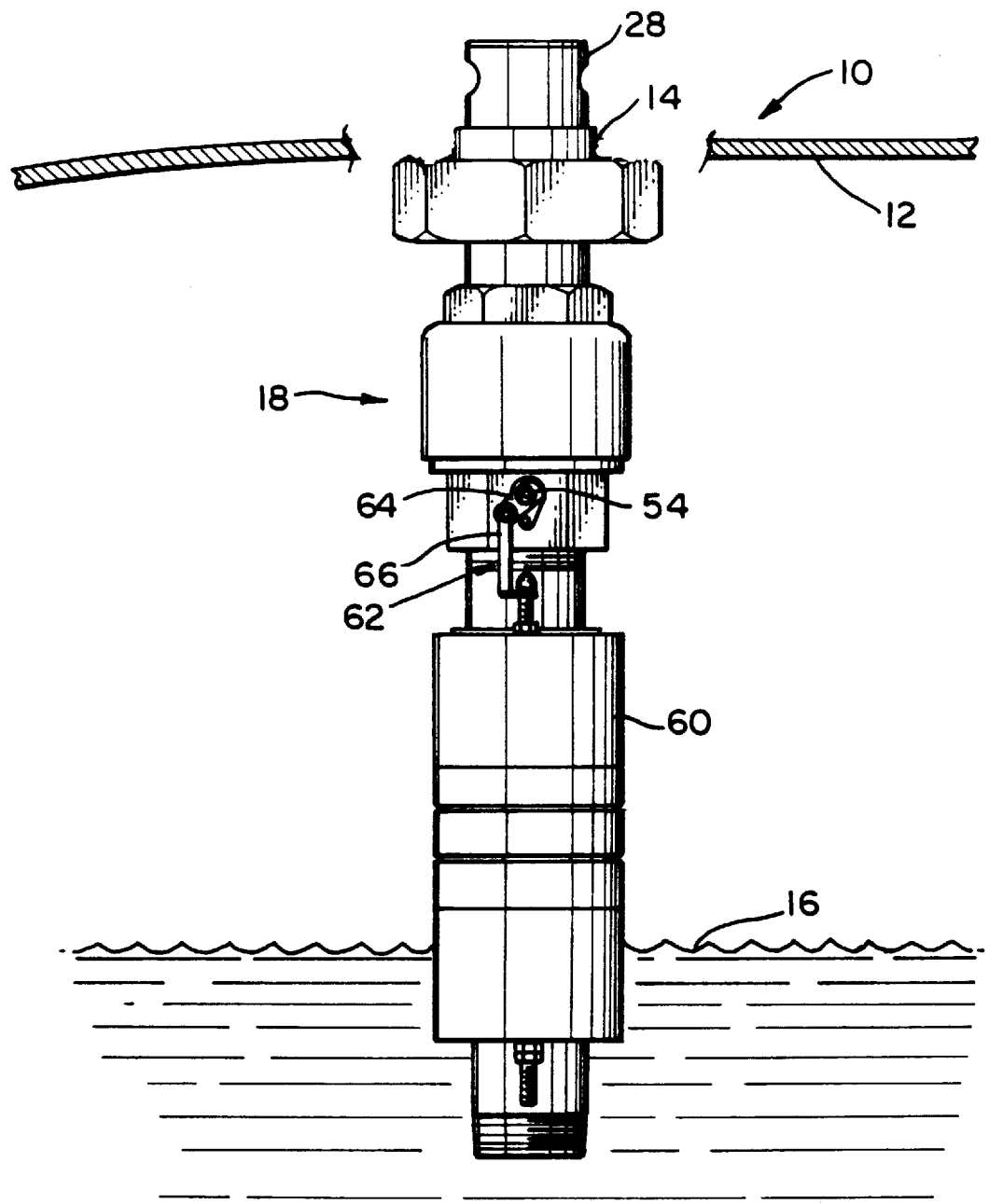
FIG. 1 is a partially diagrammatical side elevational view of an improved storage tank system that is constructed according to a preferred embodiment of the invention.

Referring now to the drawings, wherein like reference numerals designate corresponding structure throughout the views, and referring in particular to FIG. 1, an improved storage tank system 10 that is constructed so as to be difficult to overfill is shown positioned in a fill opening 14 of a storage tank 12. The storage tank 12 is depicted as being filled to a level that is indicated by reference numeral 16.

System 10 advantageously includes an improved overfill shut-off system 18, positioned in fill opening 14, that includes passage defining structure 20 for guiding liquid through the fill opening 14 and into the storage tank 12. The passage defining structure 20, as is better shown in FIG. 2, defines a passage 22 that has a first, upper inlet end 24 and a second, lower outlet end 26. In the preferred embodiment, a coupler neck 28 is provided at the inlet end 24 of the passage defining structure 20 to connect to a mating coupler element of a fuel hose, for example, of a tanker truck. The passage defining structure 20 may also include an upper pipe 30 that is connected to the coupler neck 28, a housing 32 for elements that will be discussed in greater detail below, and a lower pipe 34 as may be seen in FIGS. 2 and 3.

Figure 2:
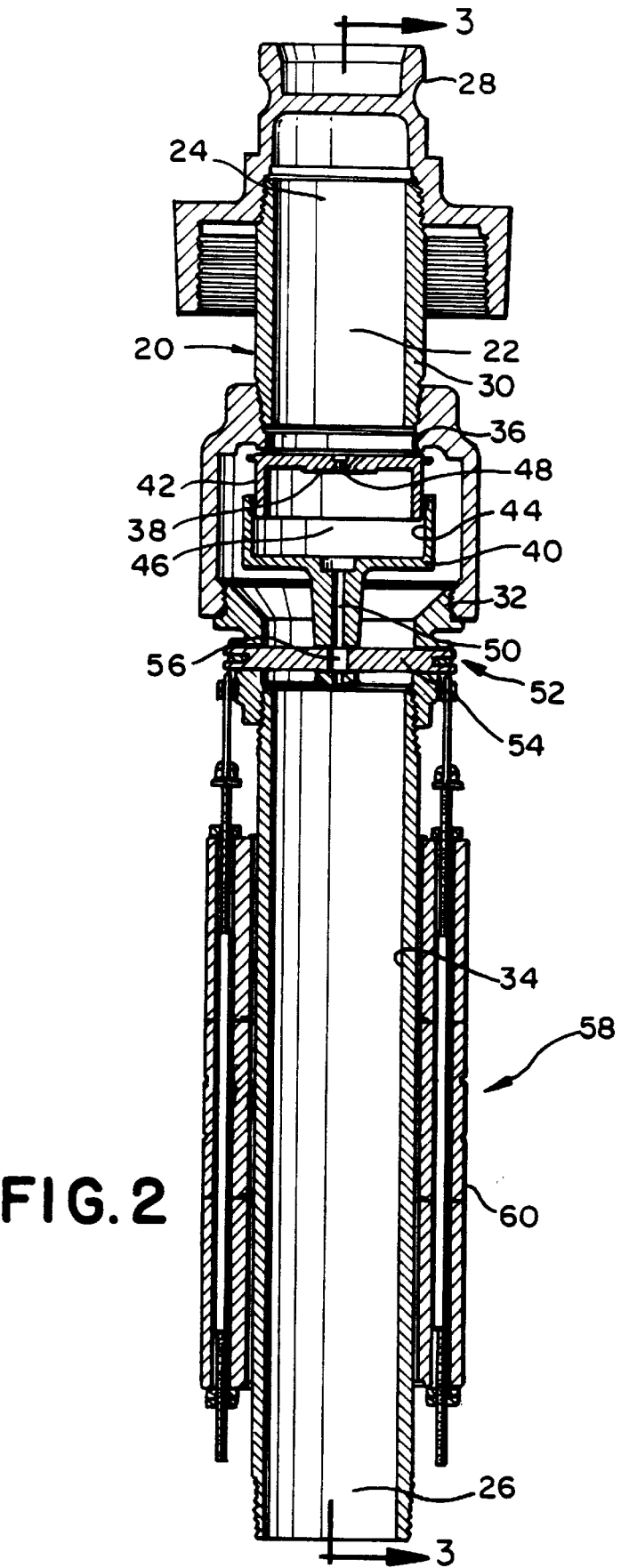
FIG. 2 is a longitudinal cross-sectional view taken through one component of the system that is shown in FIG. 1, taken along lines 2—2 in FIG. 3.
Figure 3:
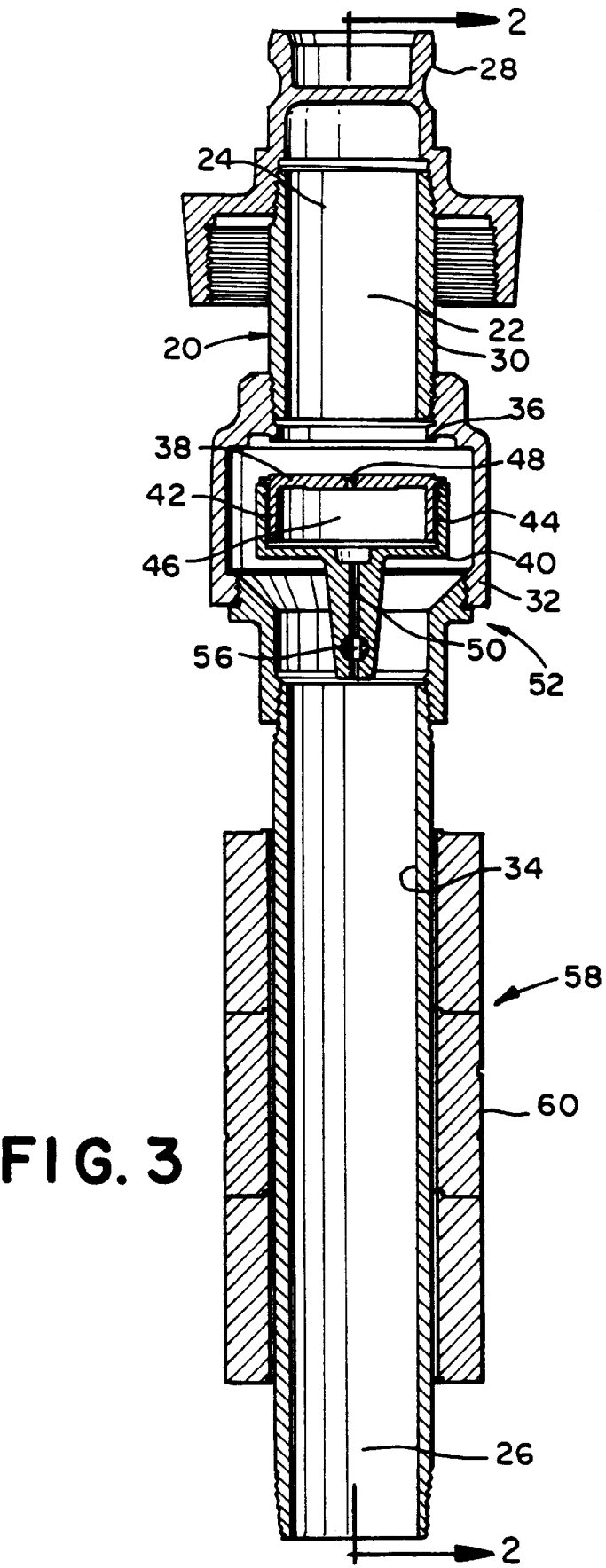
FIG. 3 is a longitudinal cross-sectional view taken along lines 3—3 in FIG. 2.

As may also be seen in FIGS. 2 and 3, a valve seat 36 is provided at an upper portion of the housing 32 of the passage defining structure 20. A plunger member 38 is movably positioned within the portion of the passage 22 that is defined by the inner surface of housing 32, and is constructed in size to engage the valve seat 36 in order to impede flow of liquid through the passage 22 when it is so seated. Plunger member 38 is telescopically mounted within a guide member 40 that is mounted fixably to the passage defining structure 20, as may best be seen in FIGS. 2 and 3. In the preferred embodiment, plunger member 38 has a downwardly depending cylindrical portion 42 that has an outer wall that is sealed with respect to an inner wall 44 of the guide member 40. The plunger 38 is thus free to move upwardly and downwardly with respect to the guide member 40, as shown in FIG. 2. The plunger member 38 and guide member 40 cooperate to define a control space 46 therebetween, as is also shown in FIG. 2. A first port 48 is defined in the plunger member 38 for communicating the control space 46 with the inlet end 24 of the passage 22. Similarly, a second port 50 is defined in the guide member 40 for communicating the control space 46 with the downstream, outlet end 26 of the passage 22. Preferably, the second port that is defined in guide member 40 is larger than the first port 48 that is defined in plunger 38, the size differential therebetween tending to create an underpressure in the control space 46 that will urge the plunger member 38 to a retracted position within the guide member 40 when the storage tank 12 is being filled. FIG. 3 depicts the plunger 38 in such a retracted position.

Referring again to FIGS. 2 and 3, it will be seen that a valve 52 is provided for selectively impeding fluid flow through the second port 50 that is defined in the guide member 40. In the preferred embodiment, valve 52 includes a rod member 54 that has a diametrical bore 56 defined therein. The bore 56 is communicated with the second port 50 when the rod 54 is in a first position of rotation, shown in FIG. 2. However, when the rod 54 is rotated to a second position of rotation, the bore 56 will be discommunicated from the second port 50, thereby impeding fluid flow through the second port 50.

System 10 further includes a level response system 58 that in the preferred embodiment includes a float member 60 that is concentrically mounted about the lower pipe 34 of the passage defining structure 20. A mechanical linkage 62 couples the float member 60 to the rod member 54 of valve 52 so that, during normal operating conditions, the valve 52 is open but that when the float 60 rises to a level that corresponds to a predetermined maximum fill limit for the storage tank 12 the rod 54 will be rotated to the second position of rotation to close the valve 52. In the preferred embodiment, and as is best shown in FIG. 1, the mechanical linkage 62 is preferably embodied as a crank member 64 that is connected to the rod 54, and a connecting rod 66 for coupling the float member 60 to the crank 64.

Figure 4:
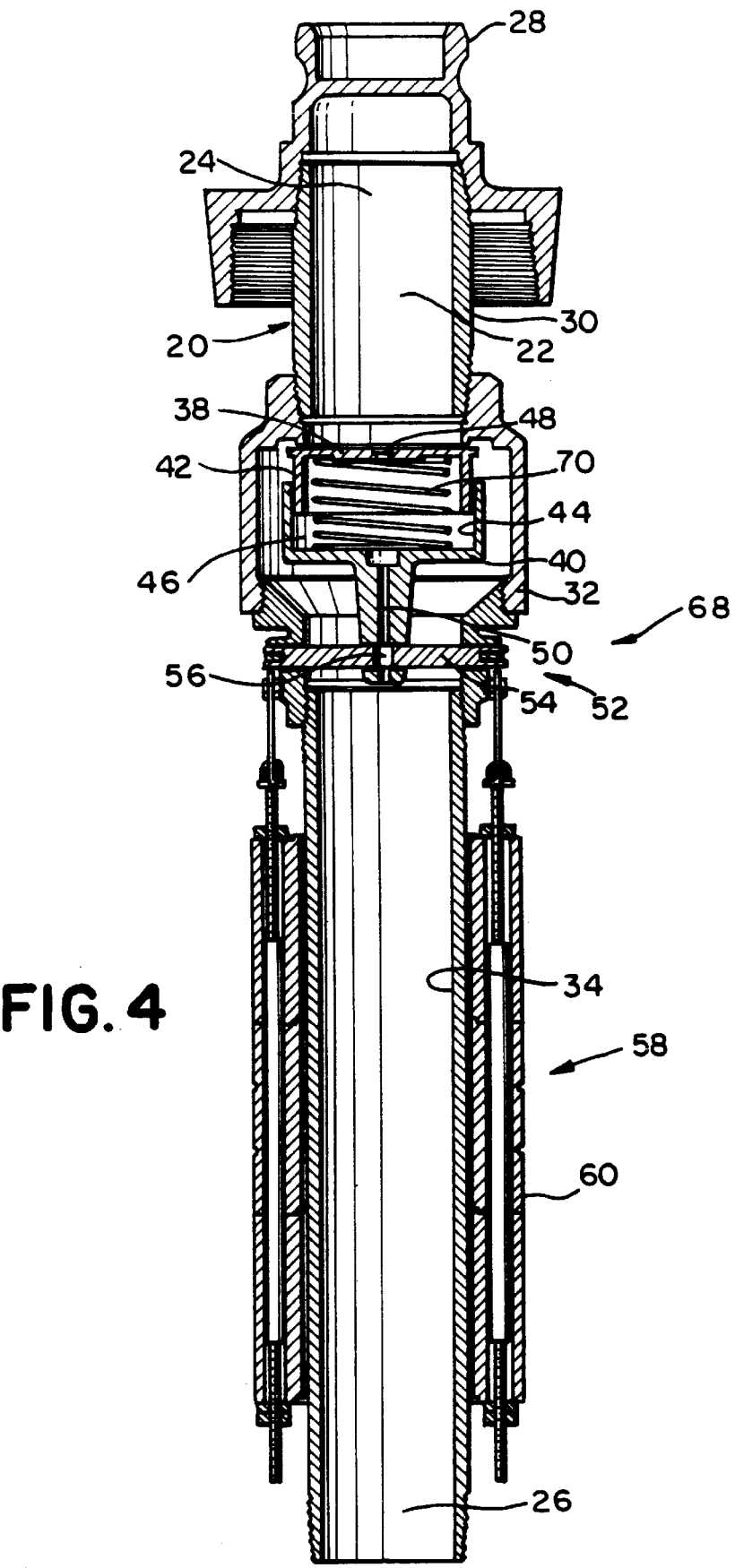
FIG. 4 is a longitudinal cross-sectional view, similar to that shown in FIG. 2, that represents a second embodiment of the invention.

Referring briefly to the second embodiment of the invention that is depicted in FIG. 4 of the drawings, an alternatively constructed overfill shut-off system 68 is identical in all respects to the system that is described above with reference to FIGS. 1–3, except that a biasing spring 70 is provided within the control space 46 between the plunger member 38 and the guide member 40. Biasing spring 70 acts to urge the plunger member 38 toward the valve seat 36, which permits the system to respond to an overfill condition at lower flow rates than would be possible without the biasing spring.

In operation, the system constructed according to embodiment of FIGS. 1–3 will operate as follows. When the fluid level 16 and the storage tank 12 is beneath the predetermined maximum level, float 60 will be in a lower position that corresponds to the valve that controls fluid flow through the second port 50 of the guide member 40 being in an open position. Liquid, such as fuel that is being introduced into the coupler neck 28 of the passage defining structure 20 by a tanker truck, will flow freely through passage 22, most of it going around the guide member 40 and the plunger 38 and out of the outlet end 26 of passage 22. The plunger 38 will at this point be retracted within the guide member 40, as shown in FIG. 3. Since the first port 48 and the plunger member 38 is smaller than the second port 50 and the guide member 40, an underpressure will be induced in the control space 46 to insure that the plunger member 38 stays in the retracted position. However, when the fluid level 16 in the storage tank 12 begins to approach the predetermined maximum, float 60 will rise, thus turning the rod 54 in the valve 52 to the second rotational position where fluid flow through the second port 50 is impeded, and finally stopped. At this point, continued flow of fluid through the first port 48 into the control space 46 creates an overpressure in the control space 46, causing the plunger member 38 to rise until it seats against the valve seat 36, thereby preventing further liquid from flowing through the passage 22 and preventing overfill of the storage tank 12. When the hose from the tanker truck is disconnected from the coupler neck 28 of the passage defining structure 20, some fuel will remain in the inlet end 24 of the passage 22. As the inlet pressure drops, the plunger 38 will unseat from the valve seat 36, permitting this trapped liquid to fall downwardly into the storage tank 12.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. An overfill shut-off system for insertion and removable as a single unit through a fill opening in liquid storage tanks of different sizes and capacities used to store a volatile liquid such as gasoline at or near atmospheric pressures, comprising:

passage defining means for guiding liquid through the fill opening into a storage tank, said passage defining means defining a passage having an inlet end and an outlet end;

a valve seat that is connected to said passage defining means;

plunger means movably positioned within said passage for engaging said valve seat to impede flow of liquid in said passage;

guide means, positioned within said passage and sized so as not to occlude said passage, for guiding movement of said plunger means, said plunger means being sealed with respect to an upper portion of said guide means and together with said guide means defining a control space;

a first port defined in said plunger means for communicating said control space with an upstream end of said passage;

a second port defined in a lower portion of said guide means for communicating said control space with a downstream end of said passage;

valve means for selectively impeding fluid flow through said second port, said second port having no other impediments to flow therethrough other than said valve means;

said second port comprising an elongated bore that is defined in said guide member and coaxial with said passage throughout the length of said bore so as to minimize disruption of volatile fluid flow therethrough, and said valve means comprising a rod member that is mounted for rotation within a hole in said guide member that transversely intersects said elongated bore, said rod member having a diametrical bore defined therein, whereby said diametrical bore is aligned with said elongated bore when said valve means is opened, and is not so aligned when said valve means is closed; and level responsive means for opening and closing said valve means, said level responsive means closing said valve means when the liquid level in a liquid storage tank reaches a predetermined maximum level, said level responsive means comprising a float member concentrically mounted about and along a length of said passage defining means between said outlet end and said valve means and having connection means operatively and adjustably connected to the ends of said rod member for rotation thereof between said open and closed positions at varying liquid levels, said connection means being guided through an exterior portion of said passage defining means, whereby liquid flowing through said passage will be permitted through said first port, but not through said second port, creating a hydraulic effect that will expand said control space and extend said plunger to engage said valve seat, thereby preventing overfill of the storage tank.

2. An overfill shut-off system for insertion in a fuel opening in a liquid storage tank according to claim 1 wherein the connection means between said valve means and the ends of said rod member comprises a mechanical linkage having a crank member connected to the rod member and a connecting rod for coupling the float member to the crank member.

3. An overfill shut-off system for insertion in a fill opening of a liquid storage tank according to claim 1, including a biasing spring positioned between said plunger means and said guide means for urging the plunger means toward the valve seat thereby permitting the system to respond to an overfill condition at lower flow rates than would be possible without the biasing spring.

* * * * *